(12) United States Patent
Mizobuchi et al.

(10) Patent No.: US 6,713,032 B2
(45) Date of Patent: *Mar. 30, 2004

(54) CATALYST FOR REMOVING CARBON MONOXIDE IN HYDROGEN RICH GAS AND PRODUCTION METHOD THEREFOR

(75) Inventors: Manabu Mizobuchi, Kobe (JP); Kensaku Kinugawa, Ikoma-gun (JP); Noboru Hashimoto, Suita (JP); Akira Igarashi, 6-3-5-111, Uchiya, Saitama-shi, Saitama 336-0034 (JP); Hajime Iida, Hachioji (JP)

(73) Assignees: Matsushita Electric Works, Ltd., Kadoma (JP); Akira Igarashi, Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/147,864

(22) Filed: May 20, 2002

(65) Prior Publication Data

US 2003/0195115 A1 Oct. 16, 2003

(30) Foreign Application Priority Data

Apr. 12, 2002 (JP) .......................................... 2002-111232

(51) Int. Cl.[7] .............................. B01J 8/00; B01J 23/42; B01J 23/44; C01B 31/18; C01K 1/20
(52) U.S. Cl. ........................ 423/247; 502/326; 502/339; 502/350; 502/439
(58) Field of Search ................................. 502/326, 334, 502/339, 350, 439; 423/610, 247

(56) References Cited

U.S. PATENT DOCUMENTS

| | | | |
|---|---|---|---|
| 4,003,817 A | 1/1977 | Bianchi et al. | 204/290 F |
| 4,207,169 A * | 6/1980 | Courty et al. | 208/124 |
| 4,371,728 A | 2/1983 | Farha, Jr. et al. | 585/258 |
| 4,547,525 A | 10/1985 | Kim | 518/713 |
| 4,558,030 A * | 12/1985 | Arcuri et al. | 502/325 |
| 4,567,205 A * | 1/1986 | Arcuri et al. | 518/715 |
| 4,857,559 A | 8/1989 | Eri et al. | 518/700 |
| 5,227,407 A | 7/1993 | Kim | 518/700 |
| 5,904,913 A | 5/1999 | Boehm et al. | |
| 6,111,141 A * | 8/2000 | Eller et al. | 564/473 |
| 6,121,191 A * | 9/2000 | Komatsu et al. | 502/330 |
| 6,265,341 B1 | 7/2001 | Komatsu et al. | 502/326 |
| 6,291,715 B1 | 9/2001 | Ruilder et al. | 564/497 |
| 6,315,963 B1 | 11/2001 | Speer | 422/186.3 |
| 6,353,035 B2 | 3/2002 | Manzer et al. | 518/700 |
| 6,365,545 B1 * | 4/2002 | Komatsu et al. | 502/326 |
| 6,476,085 B2 * | 11/2002 | Manzer et al. | 518/715 |

FOREIGN PATENT DOCUMENTS

| | | |
|---|---|---|
| EP | 1 161 991 | 12/2001 |
| JP | 2000-342968 | 12/2000 |
| JP | 3215680 | 7/2001 |
| JP | 2001-347166 | 12/2001 |
| WO | WO00/54879 | 9/2000 |

OTHER PUBLICATIONS

Hajime Iida, et al., "Low Temperature Water Gas Shift Reaction over Pt–Re Catalysts Supported On ZrO3 and TiO2," Adv. In Tech. of Mat. Proc., vol. 4, No. 2, 2002, pp. 62–65.

* cited by examiner

Primary Examiner—Cam N. Nguyen
(74) Attorney, Agent, or Firm—Oblon, Spivak, McClelland, Maier & Neustadt, P.C.

(57) ABSTRACT

A catalyst for removing carbon monoxide (CO) in a hydrogen rich gas according to a water gas shift reaction is provided, which is characterized in that platinum and rhenium are supported on rutile titania as a support. This catalyst provides a high CO conversion at a relatively low reaction temperature between 200° C. and 300° C. and is excellent in cost/performance due to a reduction in amount of supported platinum. It is preferred that a weight ratio of an amount of supported platinum to an amount of supported rhenium is in a range of 3:1 to 1:1, and particularly 3:2. In addition, when the catalyst is produced by supporting rhenium first and then platinum on the support, the catalyst performance can be remarkably improved.

20 Claims, 6 Drawing Sheets

- Example 2 (supporting Re first and then Pt)
- Example 7 (supporting Pt first and then Re)
- Example 8 (supporting Re and Pt at the same time)
- - - equilibrium curve

CATALYST FOR REMOVING CARBON MONOXIDE IN HYDROGEN RICH GAS AND PRODUCTION METHOD THEREFOR

BACKGROUND OF THE INVENTION

1. Field of the Invention

The present invention relates to a catalyst used to selectively remove carbon monoxide (CO) in a hydrogen rich gas according to a water gas shift reaction, and a production method therefor.

2. Disclosure of the Prior Art

In recent years, proton-exchange membrane fuel cells having advantages of a low operation temperature, high power density, reductions in size and weight and an accelerated start-up time receive widespread attention as a fuel cell power generation system of the next generation, and are expected in applications to cars, compact electric generators, home cogeneration devices and so on. In the proton-exchange membrane fuel cells, a perfluorosulfonic acid based polymer film is used as a proton-conductive solid electrolyte, and can be operated at a temperature between 50° C. to 100° C.

However, since a hydrogen rich gas generated by a reaction between steam and a hydrocarbon fuel or an alcohol fuel such as methanol is used as a hydrogen source for the fuel-cell power generation system, there is a problem that the proton-exchange membrane fuel cells easily receive damages by the presence of impurities in the hydrogen rich gas. In particular, carbon monoxide (CO) in the hydrogen rich gas gives considerable damages to platinum used as electrode materials. When the CO concentration in the hydrogen rich gas exceeds a threshold value, the power generation capacity lowers.

To avoid the damages of platinum caused by carbon monoxide, it is proposed to set up a CO removing device for removing carbon monoxide in the hydrogen rich gas such that the CO concentration becomes about 1% or less, and a device for selective oxidation reaction of further reducing the CO concentration to 50 PPM or less.

By the way, the CO removing device uses a catalyst for selectively removing carbon monoxide in the hydrogen rich gas according to a water gas shift reaction. As this kind of catalyst, for example, Japanese Patent Gazette No. 3215680 discloses a catalyst for a water gas shift reaction, which is characterized in that platinum and rhenium are supported on a support of zirconia. There are advantages this catalyst shows a higher catalyst activity than a conventional copper-zinc catalyst, and a deterioration with time of the catalyst performance is relatively small.

However, there is a problem that the CO conversion of the catalyst according to the water gas shift reaction rapidly decreases under conditions of a reaction temperature of 250° C. or less and a high space velocity, i.e., a large supply amount of the hydrogen rich gas. This means that a higher reaction temperature is needed to efficiently remove carbon monoxide in the hydrogen rich gas. In addition, since a relatively large amount of platinum must be supported on zirconia to obtain a desired catalyst performance, there is still plenty of room for improvement in cost/performance of the catalyst.

SUMMARY OF THE INVENTION

Therefore, a primary object of the present invention is to provide a catalyst for removing carbon monoxide in a hydrogen rich gas, which has the capability of providing an improved CO conversion at a relatively low reaction temperature between 200° C. and 300° C. and excellent cost/performance due to a reduction in amount of platinum used in the catalyst, while maintaining the advantages of a conventional catalyst characterized in that rhenium and platinum are supported on zirconia. That is, the catalyst of the present invention is characterized in that platinum and rhenium are supported on rutile titania.

It is preferred that an amount of supported platinum is in a range of 0.05 to 3% with respect to catalyst weight. In addition, it is preferred that an amount of supported rhenium is in a range of 0.01 to 10% with respect to catalyst weight.

It is also preferred that a weight ratio of an amount of supported platinum to an amount of supported rhenium is in a range of 3:1 to 1:1.

Another object of the present invention is to provide a preferred method of producing the above-described catalyst. That is, the method comprises a first step of supporting rhenium on rutile titania, and a second step of supporting platinum on the support after the first step. In this case, there is a great advantage that a CO conversion of the catalyst according to the water gas shift reaction is 60% or more when it is measured at a reaction temperature of 250° C., with respect to a mixture gas obtained by mixing a hydrogen rich gas containing about 12% of carbon monoxide with water such that a mole ratio of $H_2O/CO$ is substantially equal to 4.3, in the case that an amount of the hydrogen rich gas treated per unit weight of supported platinum is in a range of 5000 to 5500 [cc/(min·g(Pt))].

These and still other objects and advantages of the present invention will become more apparent from the following detail description and preferred examples of the present invention, referring to the attached drawings.

The present disclosure relates to subject matters contained in Japanese Patent Application No. 2002-111232, which was filed on Apr. 12, 2002, the disclosure of which is expressly incorporated herein by reference in its entirety.

DETAIL DESCRIPTION OF THE INVENTION

Figure 1:
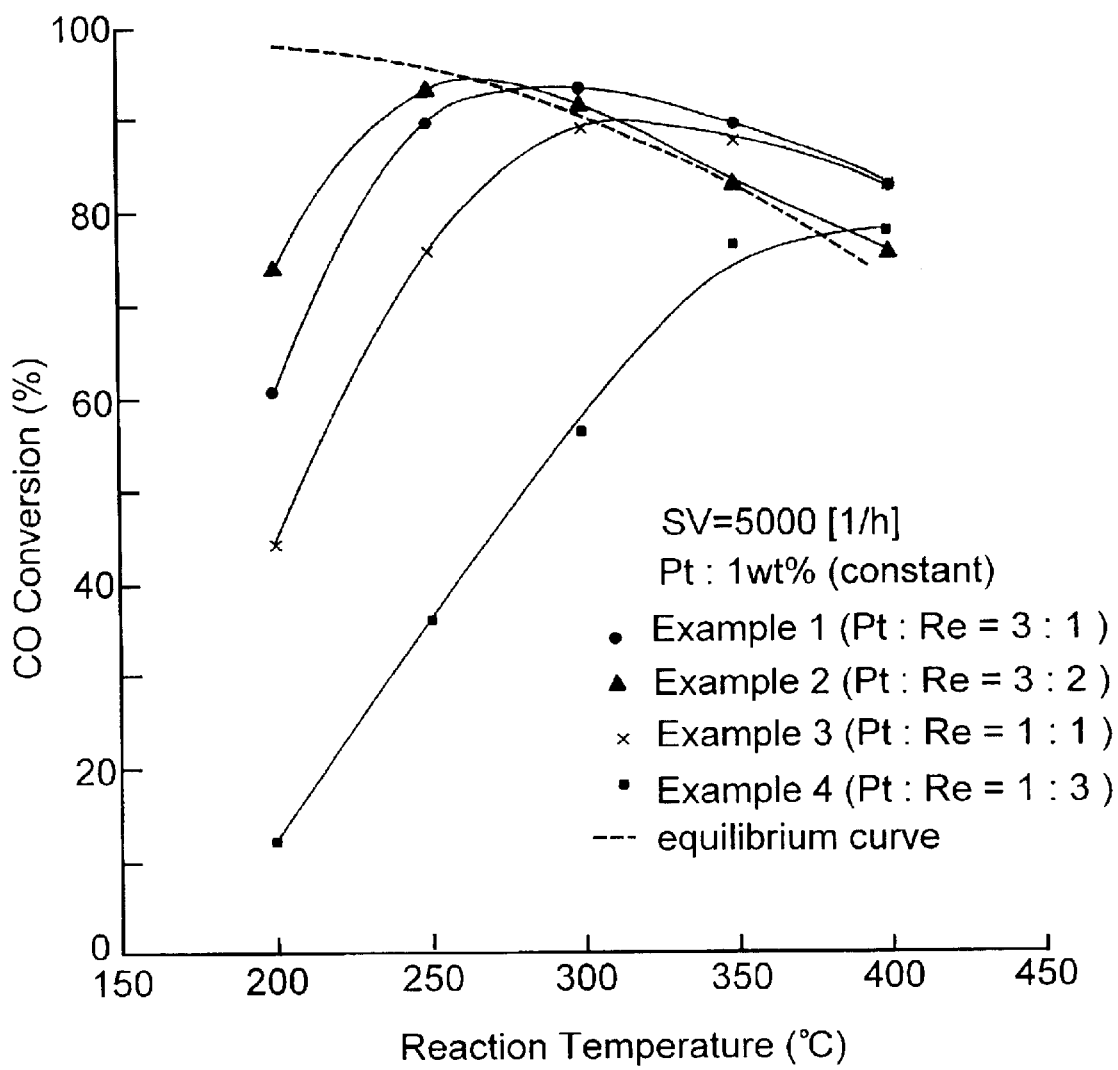
FIG. 1 is a graph showing relationships between a reaction temperature and a CO conversion with respect to catalysts of Examples 1 to 4 of the present invention.

A catalyst for removing carbon monoxide in a hydrogen rich gas of the present invention is explained in detail below.

The catalyst of the present invention is characterized in that platinum and rhenium are supported on rutile titania. Rutile titania as the support can be prepared by, for example, dissolving titanium ores as a starting material in sulfuric acid, heating and calcining a resultant solution. In addition, titania-coated particles obtained by coating rutile titania on particles of a metal oxide such as alumina, zirconia, silica-alumina, zeolite, magnesia, niobium oxide, zinc oxide, chromium oxide or the like may be used as the support.

It is preferred that an amount of supported platinum is in a range of 0.05% to 3% with respect to catalyst weight. When the amount of supported platinum is less than 0.05%, there is a fear that the catalyst does not show a sufficient catalyst activity in the water shift gas reaction for converting carbon monoxide (CO) in the hydrogen rich gas into carbon dioxide ($CO_2$). On the other hand, when the amount of supported platinum is more than 3%, it is not expected to further increase the catalyst activity. Therefore, in such a case, a deterioration in cost/performance of the catalyst cost comes into a problem. In addition, since a methanation reaction that is a hydrogen consumption reaction caused at a high reaction temperature region is enhanced, there is a tendency of lowering the hydrogen concentration obtained.

In the present invention, it has been found that the catalyst activity can be remarkably improved at a relatively low temperature between 200° C. and 300° C. by supporting both of rhenium and platinum on the support. It is preferred that an amount of supported rhenium is in a range of 0.01% to 10% with respect to catalyst weight. When the amount of supported rhenium is less than 0.01%, it becomes difficult to sufficiently obtain an additive effect of rhenium to the water gas shift reaction. On the other hand, when the amount of supported rhenium is more than 10%, the additive effect of rhenium to the catalyst activity is saturated, so that the cost/performance of the catalyst may deteriorate.

In addition, it is preferred that a weight ratio of an amount of supported platinum to an amount of supported rhenium is in a range of 3:1 to 1:1, and particularly 3:2.

Next, a method of producing the above-described catalyst of the present invention is explained. For example, an aqueous solution of a rhenium salt is added to rutile titania, and then water in a resultant mixture is evaporated with agitation to obtain a first intermediate product. The first intermediate product is dried by heating, so that rhenium is supported on the support. Subsequently, an aqueous solution of a platinum salt is added to the support on which rhenium is already supported. Water in a resultant mixture is evaporated with agitation to obtain a second intermediate product. The second intermediate product is dried by heating, so that platinum is supported on the support with the already supported rhenium.

After the rutile titania supporting platinum and rhenium thereon is pulverized and calcined, an obtained calcining body is press-molded to obtain a pellet. By pulverizing the pellet to a particle size of 0.5 mm to 1 mm, the catalyst of the present invention is obtained, which is characterized in that rhenium and platinum are supported on rutile titania.

The catalyst of the present invention can be produced by methods other than the above-described method. For example, the catalyst may be produced by supporting platinum first on rutile titania and then supporting rhenium on the support. Alternatively, the catalyst of the present invention may be produced by adding aqueous solutions of platinum and rhenium salts to rutile titania at a time. Therefore, in this case, platinum and rhenium can be simultaneously supported on the support.

However, it is particularly preferred to supporting rhenium first on rutile titania and then support platinum on the support. According to this method, it is possible to stably obtain a great advantage that a CO conversion of the catalyst according to the water gas shift reaction is 60% or more when it is measured at a reaction temperature of 250° C., with respect to a mixture gas obtained by mixing a hydrogen rich gas containing about 12% of carbon monoxide with water such that a mole ratio of $H_2O/CO$ (=S/C) is substantially equal to 4.3, in the case that an amount of the hydrogen rich gas treated per unit weight of supported platinum is in a range of 5000 to 5500 [cc/(min·g(Pt))], and specifically about 5300 [cc/(min·g(Pt))]. The effectiveness of this particularly preferred production method of the present invention will be further clearly understood by Examples shown below.

By the way, in this technical field, a "space velocity" (SV, [1/h]) that is "an amount of the hydrogen rich gas treated per unit volume of the catalyst" is usually used to discuss the catalyst performance. However, when catalysts with different amounts of supported platinum are used, it is difficult to accurately evaluate a difference in CO conversion between those catalysts under a constant "SV" condition. In other words, even when the SV condition is constant, a higher CO conversion can be achieved by simply increasing the amount of supported platinum. Therefore, in the present invention, as a precondition for discussing the CO conversion of the catalyst, a definition of "an amount ($SV_{(Pt)}$, [cc/(min·g(Pt))])" of the hydrogen rich gas treated per unit weight of platinum supported on the support" is used. Thereby, it is possible to accurately perform a reasonable comparison in CO conversion between the catalysts with different amounts of supported platinum. Of course, when the amount of supported platinum is constant, it is possible to accurately evaluate the CO conversion under the constant SV condition.

For example, the amount of the hydrogen rich gas treated per unit weight of supported platinum can be determined by the following procedure. When an amount of supported platinum is 3% by weight, and a weight of the catalyst used for evaluation is 6.4 g, a weight of platinum in the catalyst is 0.19 g (=6.4 g×3.0/100). When an amount of a hydrogen rich gas supplied to evaluate the catalyst performance is 1000 [cc/min], "the amount of the hydrogen rich gas treated per unit weight of supported platinum" is approximately 5300 [cc/(min·g(Pt))](=1000 [cc/min]÷0.19 [g]).

EXAMPLES

Examples 1 to 6 and Comparative Example 1

Using a calcining furnace, a reagent of rutile titania (a reference catalyst supplied by the Catalysis Society of Japan) was subjected to a calcining treatment wherein it was heated to a temperature of 500° C. in one hour in an air flow of 60 ml/min, and kept at the temperature for one hour, and thereby a rutile titania support of Example 1 was prepared.

A required amount of the obtained rutile-titania support was put on an evaporation pan located in a hot water bath. Then pure water was added to the support and they were mixed intimately. Next, an aqueous solution of ammonium perrhenate ($NH_4ReO_4$) (manufactured by NACALAI TESQE INC.) was added to the evaporation pan. Pure water was further added to reach a predetermined concentration. By agitating a resultant mixture on the evaporation pan located in the hot water bath, water included in the resultant mixture was evaporated, while a metal salt depositing on a wall of the evaporation pan was being washed away with pure water into the bottom of the evaporation pan. After the evaporation, the mixture was further dried at about 100° C. for at least 12 hours, so that rhenium was supported on rutile titania.

Next, a required amount of the support with rhenium thereon was put on an evaporation pan located in a hot water bath. Then pure water was added to the support and they were mixed intimately. Next, a dinitrodiamine-platinum(II) nitricacid solution (manufactured by TANAKA KIKIN-ZOKU KOGYO K.K.) was added to the evaporation pan. Pure water was further added to reach a predetermined concentration. By agitating a resultant mixture on the evaporation pan located in the hot water bath, water included in the resultant mixture was evaporated in two hours, while a metal salt depositing on a wall of the evaporation pan was being washed away with pure water into the bottom of the evaporation pan. After the evaporation, the mixture was further dried at about 100° C. for at least 15 hours, so that platinum was supported on the support with the already supported rhenium.

After the dried mixture was pulverized into powder in a mortar, the powder was heated to a temperature of 500° C. in one hour in an air flow of 60 ml/min, and calcined at the temperature for one hour. In addition, the calcined powder was pressed at a pressure of 3600 kg/cm$^2$ for 10 seconds by use of a manual hydraulic compressing machine to obtain pellets having a required shape. Those pellets were pulverized into particles of which diameter is in the range between 1.4 mm and 2.0 mm. Thus, the catalyst for removing carbon monoxide of Example 1 was obtained, which is characterized in that platinum and rhenium are supported on rutile titania.

To obtain the catalysts of Examples 1 to 6, the additive amounts of dinitrodiamine platinum and ammonium perrhenate were controlled such that the amounts of platinum and rhenium listed in Table 1 are supported on the support. That is, in Examples 1 to 4, under a condition that the amount of supported platinum is 1% with respect to catalyst weight, the amount of supported rhenium was changed in a range of 3:1 to 1:3 of a weight ratio of the amount of supported platinum to the amount of supported rhenium. In Examples 5 and 6, under a condition that the weight ratio of the amount of supported platinum to the amount of supported rhenium is 3:2, the amount of supported platinum was changed, as listed in Table 1.

A catalyst of Comparative Example 1 was prepared by the following method. That is, using the calcining furnace, a reagent of zirconia (a reference catalyst supplied by the Catalysis Society of Japan) was subjected to a calcining treatment wherein it was heated to a temperature of 500° C. in one hour in an air flow of 60 ml/min, and kept at the temperature for one hour, and thereby the zirconia of Comparative Example 1 was prepared. Then, according to a substantially same method as Example 1, the catalyst of Comparative Example 1 was obtained by supporting platinum and rhenium on the zirconia support such that the amount of supported platinum is 3% and the amount of supported rhenium is 2% with respect to catalyst weight.

TABLE 1

| wt % | Support | Supported amounts | | Pt:Re |
|---|---|---|---|---|
| | | Pt | Re | |
| Example 1 | rutile titania | 1 | 0.33 | 3:1 |
| Example 2 | rutile titania | 1 | 0.67 | 3:2 |
| Example 3 | rutile titania | 1 | 1 | 1:1 |
| Example 4 | rutile titania | 1 | 3 | 1:3 |
| Example 5 | rutile titania | 3 | 2 | 3:2 |
| Example 6 | rutile titania | 0.5 | 0.33 | 3:2 |
| Comparative Example 1 | zirconia | 3 | 2 | 3:2 |

With respect to the catalysts of Examples 1 to 6 and Comparative Example 1, catalyst performance was evaluated under conditions shown below.

(1) Influence of a Ratio of Platinum to Rhenium (Under a Condition that an Amount of Supported Platinum is Constant)

With respect to each of the catalysts of Examples 1 to 4, 6 cc of the catalyst was filled in a reaction tube. The catalyst was heated to a temperature of 500° C. in one hour in a flow of a hydrogen rich gas having a composition of $H_2$(74.3%), CO(11.7%), $CO_2$(13.6%) and $CH_4$(0.4%), and kept at the temperature for one hour to carry out a reduction treatment. Subsequently, the hydrogen rich gas was mixed with water such that a mole ratio of $H_2O/CO$(=S/C) is substantially equal to 4.3. A resultant mixture of the hydrogen rich gas and water was supplied to the reaction tube at a space velocity (SV) of 5000 [1/h] or 10000 [1/h]. Under these conditions, carbon monoxide in the hydrogen rich gas was removed according to a water gas shift reaction at a reaction temperature of 200° C. After the reaction was stabilized, a treated gas was collected at an outlet of the reaction tube and analyzed by means of gas chromatography with a thermal conductivity detector and a flame ionization detector to determine a conversion of CO into $CO_2$. Similarly, the CO conversion was determined at different reaction temperatures of 250° C., 300° C., 350° C. and 400° C. Results are shown in FIGS. 1 and 2.

FIG. 1 shows a reaction temperature dependency of the CO conversion measured at the space velocity of 5000 [1/h] with respect to each of the catalysts of Examples 1 to 4. This graph shows that the highest catalyst performance (CO conversion) at the reaction temperatures of 200° C. and 250° C. that are in a low temperature region in the present experiment conditions is achieved at a ratio of platinum to rhenium between 3:1 and 1:1. That is, when the ratio of platinum to rhenium is 3:2, about 75% of the CO conversion was achieved at the reaction temperature of 200° C., and a high CO conversion of more than 90% was achieved at the reaction temperature of 250° C. When the reaction temperature exceeds 350° C., a deviation from the equilibrium curve (without consideration of the methanation reaction) increased due to the methanation reaction.

Figure 2:
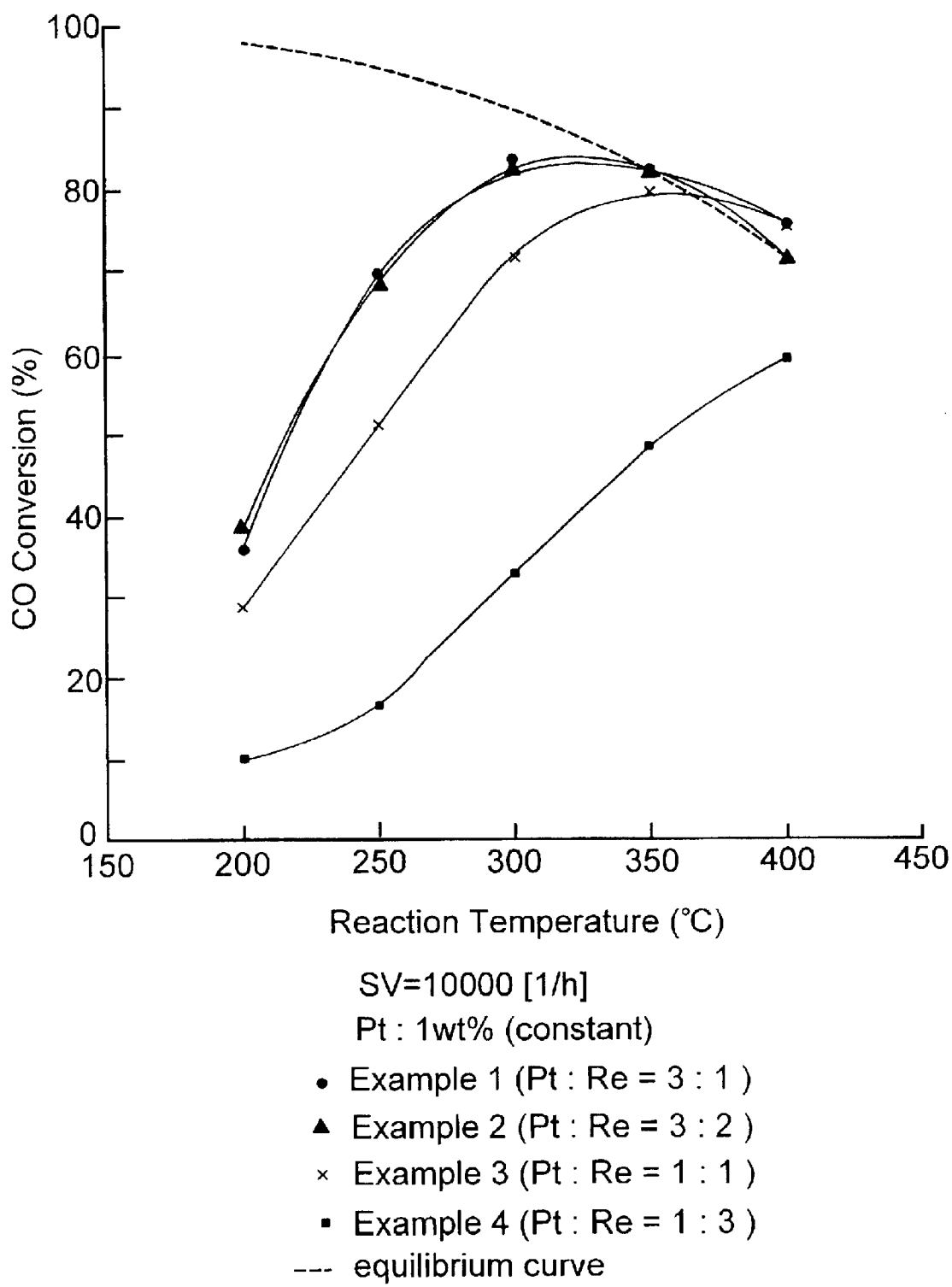
FIG. 2 is a graph showing relationships between a reaction temperature and a CO conversion under another condition with respect to the catalysts of Examples 1 to 4 of the present invention.

FIG. 2 shows a reaction temperature dependency of the CO conversion measured at a higher space velocity of 10000 [1/h] with respect to each of the catalysts of Examples 1 to 4. The reaction temperature dependency shown in this graph has similarity with FIG. 1. However, in the reaction temperature range between 200° C. and 300° C., the catalyst performance obtained at the ratio of platinum to rhenium of 3:1 is substantially equal to the catalyst performance obtained at the ratio of platinum to rhenium of 3:2. That is, when the ratio of platinum to rhenium is 3:2 (or 3:1), about 37% of the CO conversion was achieved at the reaction temperature of 200° C., and about 70% of the CO conversion was achieved at the reaction temperature of 250° C. In addition, at the reaction temperature of 300° C., a high CO conversion of more than 80% was achieved.

(2) Influence of an Amount of Supported Platinum (Under a Condition that a Ratio of Platinum to Rhenium is Constant)

With respect to each of Examples 2, 5, 6 and Comparative Example 1, 6.4 g of the catalyst were filled in a reaction tube. The catalyst was heated to a temperature of 500° C. in one hour in a flow of a hydrogen rich gas having a composition of $H_2$(74.4%), CO(11.7%), $CO_2$(13.5%) and $CH_4$(0.4%), and kept at the temperature for one hour to carry out a reduction treatment. Subsequently, the hydrogen rich gas was mixed with water such that a mole ratio of $H_2O$/CO (=S/C) is substantially equal to 4.3. A resultant mixture of the hydrogen rich gas and water was supplied to the reaction tube such that an amount ($SV_{(Pt)}$) of the hydrogen rich gas treated per unit weight of supported platinum is 2587 [cc/(min·g(Pt))] or 5173 [cc/(min·g(Pt))]. Under these conditions, carbon monoxide in the hydrogen rich gas was removed according to the water gas shift reaction at a reaction temperature of 200° C. After the reaction was stabilized, a treated gas was collected at an outlet of the reaction tube and analyzed by means of gas chromatography with a thermal conductivity detector and a flame ionization detector to determine a conversion of CO into $CO_2$. Similarly, the CO conversion was determined at different reaction temperatures of 250° C., 300° C., 350° C. and 400° C. Results are shown in FIGS. 3 and 4.

Figure 3:
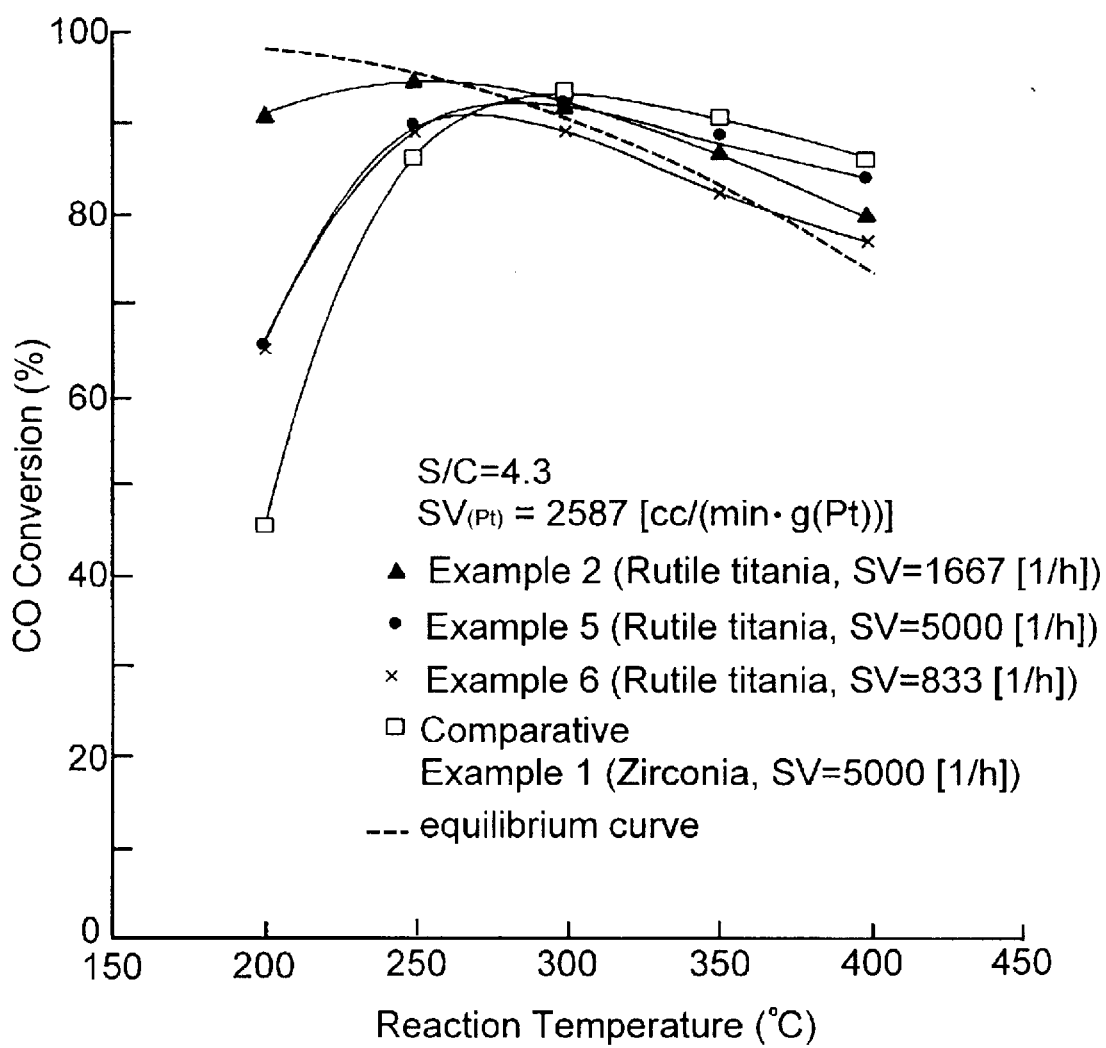
FIG. 3 is a graph showing relationships between a reaction temperature and a CO conversion with respect to catalysts of Examples 2, 5 and 6 of the present invention and Comparative Example 1.

FIG. 3 shows a reaction temperature dependency of the CO conversion measured with respect to each of the catalysts of Examples 2, 5 and 6 having different amounts of supported platinum within a range of 0.5% to 3%, under conditions that the ratio of platinum to rhenium is 3:2 (constant) and the amount ($SV_{(Pt)}$) of the hydrogen rich gas treated per unit weight of supported platinum is 2587 [cc/(min·g(Pt))]. For example, in Example 2, since the amount of supported platinum is 1% with respect to catalyst weight, the catalyst performance was evaluated at 1667 [1/h] of the space velocity to satisfy the condition that the amount ($SV_{(Pt)}$) of the hydrogen rich gas treated per unit weight of supported platinum is 2587 [cc/(min·g(Pt))]. Similarly, in Example 5, since the amount of supported platinum is 3% with respect to catalyst weight, the catalyst performance was evaluated at 5000 [1/h] of the space velocity to satisfy the condition that the amount ($SV_{(Pt)}$) of the hydrogen rich gas treated per unit weight of supported platinum is 2587 [cc/(min·g(Pt))].

This graph shows that the highest catalyst performance (CO conversion) at the reaction temperature of 200° C. that is the lowest temperature in the present experiment conditions is obtained at 1% of the amount of supported platinum, and particularly the CO conversion approximately reaches the equilibrium curve (shown by dotted line in FIG. 3) at the reaction temperature of 250° C. In addition, when the catalyst of Comparative Example 1 (zirconia support) is compared with the catalyst of Example 5 having the same amounts of supported platinum and rhenium as Comparative Example 1, a difference in CO conversion therebetween is small at the reaction temperature of 250° C. However, the difference therebetween considerably increases at the reaction temperature of 200° C. As described below, the difference in catalyst performance between the catalysts of Example 5 and Comparative Example 1 will be more clearly understood from results of the experiment performed under a more severe test condition.

Figure 4:
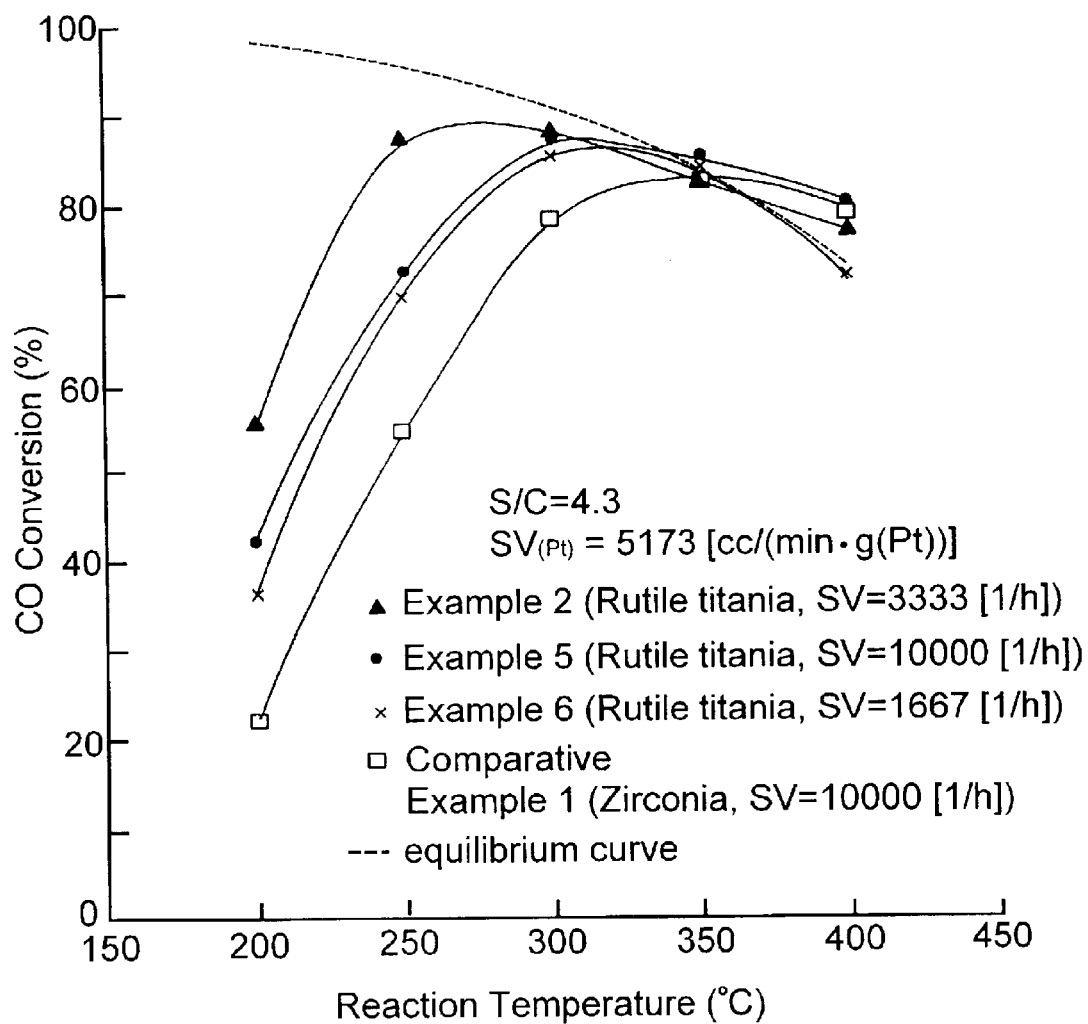
FIG. 4 is a graph showing relationships between a reaction temperature and a CO conversion under another condition with respect to the catalysts of Examples 2, 5 and 6 of the present invention and Comparative Example 1.

FIG. 4 shows a reaction temperature dependency of the CO conversion measured with respect to each of the catalysts of Examples 2, 5 and 6 having different amounts of supported platinum within a range of 0.5% to 3%, under conditions that the ratio of platinum to rhenium is 3:2 (constant) and the amount ($SV_{(Pt)}$) of the hydrogen rich gas treated per unit weight of supported platinum is 5173 [cc/(min·g(Pt))] (without consideration of significant figures). When the significant figures are considered, the amount ($SV_{(Pt)}$) is approximately 5300 [cc/(min·g(Pt))].

This graph shows that the highest catalyst performance (CO conversion) at the reaction temperatures of 200° C. and 250° C. that are in a low temperature region in the present experiment conditions is obtained at 1% of the amount of supported platinum, and particularly the CO conversion exceeds 85% at the reaction temperatures of 250° C. In addition, when the catalyst of Comparative Example 1 (zirconia support) is compared with the catalyst of Example 5 having the same amounts of supported platinum and rhenium as Comparative Example 1, there is a considerable difference in CO conversion at the low reaction temperature region (200° C., 250° C.).

Example 7

A required amount of a rutile-titania support prepared by the same method as Example 1 was put on an evaporation pan located in a hot water bath. Then pure water was added to the support and they were mixed intimately. Next, a dinitrodiamine-platinum(II) nitricacid solution (manufactured by TANAKA KIKINZOKU KOGYO K.K.) was added to the evaporation pan. Pure water was further added to reach a predetermined concentration. By agitating a resultant mixture on the evaporation pan located in the hot water bath, water included in the resultant mixture was evaporated for two hours, while a metal salt depositing on a wall of the evaporation pan was being washed away with pure water into the bottom of the evaporation pan. After the evaporation, the mixture was further dried at about 100° C. for at least 15 hours, so that platinum was supported on rutile titania.

Next, a required amount of the support with platinum thereon was put on an evaporation pan located in a hot water bath. Then pure water was added to the support and they were mixed intimately. Next, an aqueous solution of ammonium perrhenate ($NH_4ReO_4$) (manufactured by NACALAI TESQE INC.) was added to the evaporation pan. Pure water was further added to reach a predetermined concentration. By agitating a resultant mixture on the evaporation pan located in the hot water bath, water included in the resultant mixture was evaporated for two hours, while a metal salt depositing on a wall of the evaporation pan was being washed away with pure water into the bottom of the evaporation pan. After the evaporation, the mixture was dried, calcined, pressed and pulverized, as in the case of Example 1, so that the catalyst of Example 7 was obtained, which is characterized in that platinum and rhenium are supported on rutile titania. In Example 7, an amount of supported platinum is 1% with respect to catalyst weight, and an amount of supported rhenium is 0.67% with respect to catalyst weight. Therefore, a weight ratio of the amount of supported platinum to the amount of supported rhenium is 3:2.

Example 8

A required amount of a rutile-titania support prepared by the same method as Example 1 was put on an evaporation pan located in a hot water bath. Then pure water was added to the support and they were mixed intimately. Next, a dinitrodiamine-platinum(II) nitricacid solution (manufactured by TANAKA KIKINZOKU KOGYO K.K.) and an aqueous solution of ammonium perrhenate ($NH_4ReO_4$) (manufactured by NACALAI TESQE INC.) were added to the evaporation pan. Pure water was further added to reach a predetermined concentration. By agitating a resultant mixture on the evaporation pan located in the hot water bath, water included in the resultant mixture was evaporated, while a metal salt depositing on a wall of the evaporation pan was being washed away with pure water into the bottom of the evaporation pan. After the evaporation, the mixture was further dried at about 100° C. for at least 12 hours, so that platinum and rhenium were supported on rutile titania at the same time. After the evaporation, the mixture was dried, calcined, pressed and pulverized, as in the case of Example 1, so that the catalyst of Example 8 was obtained, which is characterized in that platinum and rhenium are supported on rutile titania. In Example 8, an amount of supported platinum is 1% with respect to catalyst weight, and an amount of supported rhenium is 0.67% with respect to catalyst weight. Therefore, a weight ratio of the amount of supported platinum to the amount of supported rhenium is 3:2.

(3) Influence of a Method of Producing the Catalyst

With respect to each of the catalysts of Examples 2 to 7 and 8.6 cc of the catalyst was filled in a reaction tube. The catalyst was heated to a temperature of 500° C. in one hour in a flow of a hydrogen rich gas having a composition of $H_2$(72.9%), CO(12.1%), $CO_2$(14.1%) and $CH_4$(0.9%), and kept at the temperature for one hour to carry out a reduction treatment. Subsequently, the hydrogen rich gas was mixed with water such that a mole ratio of $H_2O$/CO (=S/C) is substantially equal to 4.3. The resultant mixture of the hydrogen rich gas and water was supplied to the reaction tube at a space velocity (SV) of 5000 [1/h] or 10000 [1/h]. Under these conditions, carbon monoxide in the hydrogen rich gas was removed according to the water gas shift reaction at a reaction temperature of 200° C. After the reaction was stabilized, a treated gas was collected at an outlet of the reaction tube and analyzed by means of gas chromatography with a thermal conductivity detector and a flame ionization detector to determine a conversion of CO into $CO_2$. Similarly, the CO conversion was determined at different reaction temperatures of 250° C., 300° C., 350° C. and 400° C. Results are shown in FIGS. 5 and 6.

Figure 5:
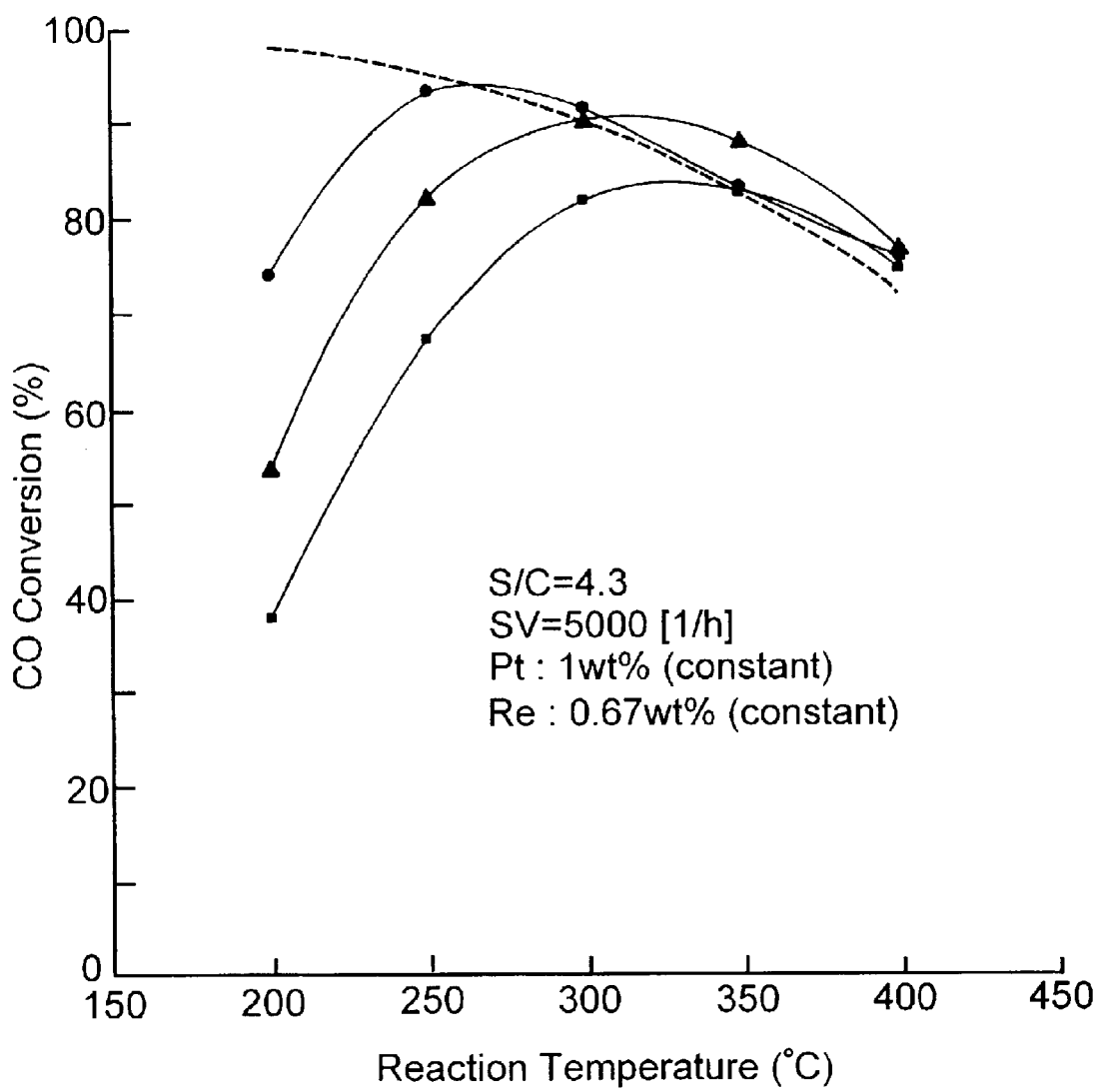
FIG. 5 is a graph showing relationships between a reaction temperature and a CO conversion with respect to catalysts of Examples 2, 7 and 8 of the present invention.

FIG. 5 shows a reaction temperature dependency of the CO conversion measured at the space velocity of 5000 [1/h] with respect to each of the catalysts of Examples 2, 7 and 8. That is, this graph shows a difference in CO conversion among the catalysts produced by the method (Example 2) of supporting rhenium first and then platinum on the support, the method (Example 7) of supporting platinum first and then rhenium on the support, and the method (Example 8) of supporting rhenium and platinum on the support at the same time, under a condition that the ratio of platinum to rhenium is 3:2. From this result, it is concluded that the catalyst produced by the method of Example 2 demonstrates the highest catalyst performance (CO conversion) at the reaction temperatures of 200° C. and 250° C. that are in a low temperature region in the present experiment conditions.

Figure 6:
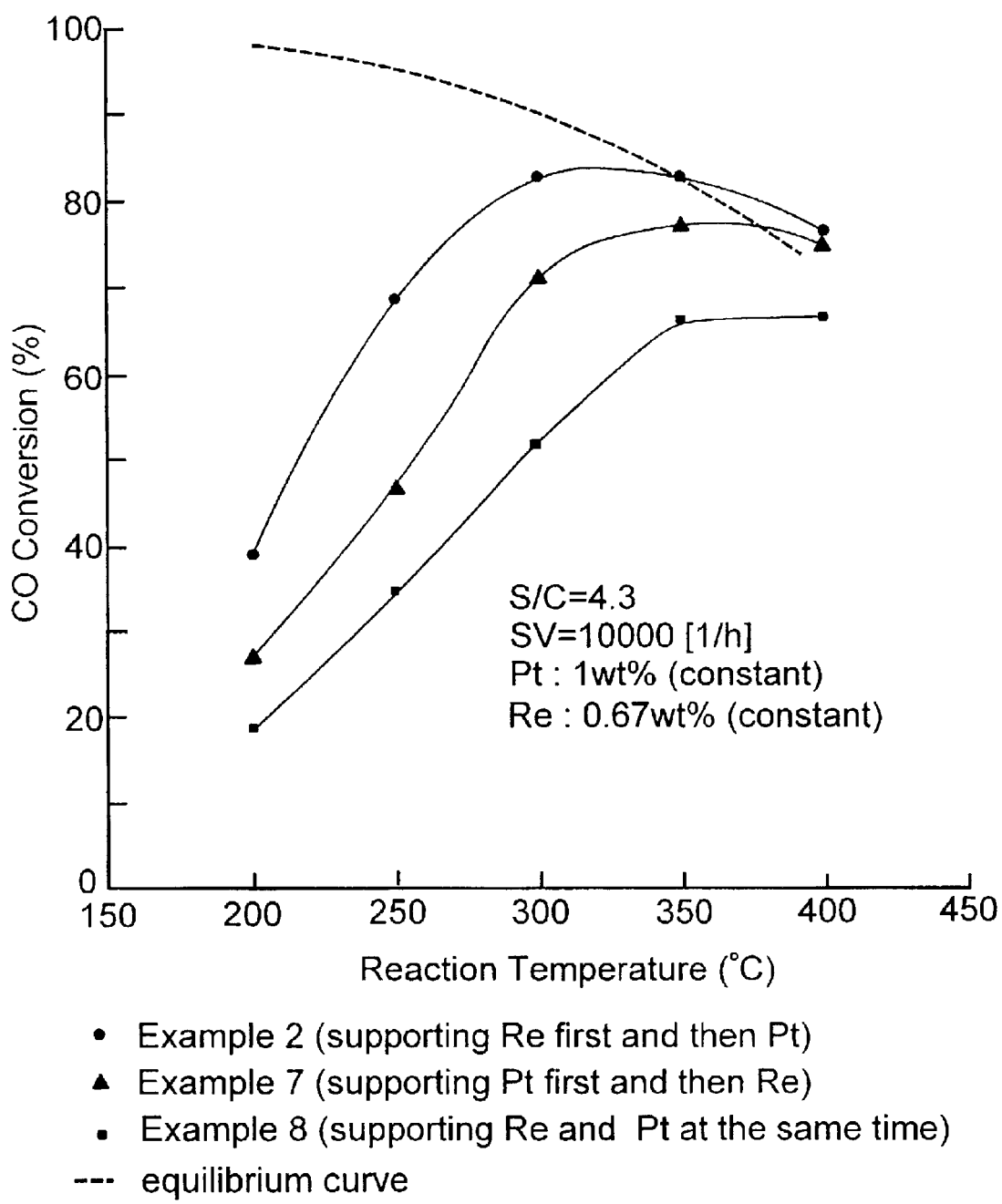
FIG. 6 is a graph showing relationships between a reaction temperature and a CO conversion under another condition with respect to the catalysts of Examples 2, 7 and 8 of the present invention.

FIG. 6 shows a reaction temperature dependency of the CO conversion measured at a higher space velocity of 10000 [1/h] with respect to each of the catalysts of Examples 2, 7 and 8. This graph shows that the catalyst produced by the method of Example 2 demonstrates excellent catalyst performance at all of the reaction temperatures of the present experiment in despite of such a severe space velocity condition. Therefore, these results indicate that the catalyst having particularly excellent catalyst performance of the present invention can be obtained by selecting the method (Example 2) of supporting rhenium first and then platinum on rutile titania. In FIGS. 5 and 6, since a methanation reaction occurred at a high reaction temperature region of more than 350° C., a deviation from the equilibrium curve (without consideration of the methanation reaction) increased.

According to the present invention, by supporting platinum and rhenium on rutile titania, it is possible to provide an improved catalyst for removing carbon monoxide in a hydrogen rich gas, which has the capability of providing a high CO conversion at a relatively low reaction temperature between 200° C. and 300° C. and excellent cost/performance due to a reduction in amount of platinum used in the catalyst, while maintaining advantages of a conventional catalyst characterized in that rhenium and platinum are supported on zirconia. That is, the catalyst of the present invention is characterized in that platinum and rhenium are supported on rutile titania. This catalyst is particularly preferable to use for a compact fuel cell power generation system of the next generation, in which start-up and start-down operations are performed over and over again.

In addition, as understood from the above Examples, when the catalyst of the present invention is produced by the method comprising the steps of supporting rhenium first, and then platinum on rutile titania, it is possible to stably obtain the catalyst of the present invention having a remarkably improved CO conversion at the relatively low temperature region.

What is claimed is:

1. A catalyst, comprising platinum and rhenium as catalyst metals on a rutile titania support, wherein the weight ratio of supported platinum to supported rhenium is in a range of 3:1 to 1:1.

2. The catalyst as set forth in claim 1, wherein when said catalyst is used in a water-gas shift reaction, a CO conversion of the catalyst in said water gas shift reaction is 60% or more when it is measured at a reaction temperature of 250° C., with respect to a mixture gas obtained by mixing a hydrogen rich gas containing about 12% of carbon monoxide with water such that a mole ratio of $H_2O$/CO is substantially equal to 4.3, in the case that an amount of the hydrogen rich gas treated per unit weight of supported platinum is in a range of 5000 to 5500 cc/(min·g(Pt)).

3. The catalyst as set forth in claim 1, wherein the amount of supported platinum is in a range of 0.05 to 3% with respect to catalyst weight.

4. The catalyst as set forth in claim 1, wherein the amount of supported rhenium is in a range of 0.01 to 10% with respect to catalyst weight.

5. The catalyst as set forth in claim 1, wherein the amount of supported platinum is 1% with respect to catalyst weight.

6. The catalyst as set forth in claim 1, wherein the amount of supported platinum is 3% with respect to catalyst weight.

7. The catalyst as set forth in claim 1, wherein the amount of supported platinum is 0.5% with respect to catalyst weight.

8. The catalyst as set forth in claim 1, wherein the amount of supported rhenium is 0.33% with respect to catalyst weight.

9. The catalyst as set forth in claim 1, wherein the amount of supported rhenium is 0.67% with respect to catalyst weight.

10. The catalyst as set forth in claim 1, wherein the amount of supported rhenium is 1% with respect to catalyst weight.

11. A method of producing the catalyst as set forth in claim 1, comprising a first step of supporting rhenium on a rutile titania support, and a second step of supporting platinum on the support after the first step.

12. A method for removing carbon monoxide from a hydrogen rich gas mixture in a water gas shift reaction comprising contacting said mixture with the catalyst as set forth in claim 1.

13. The method according to claim 12, wherein the carbon monoxide is removed at a temperature of 200–300° C.

14. A catalyst, comprising platinum and rhenium as catalyst metals on a rutile titania support, wherein the weight ratio of supported platinum to supported rhenium is in a range of 3:1 to 1:3.

15. The catalyst as set forth in claim 14, wherein the weight ratio of supported platinum to supported rhenium is 3:1.

16. The catalyst as set forth in claim 14, wherein the weight ratio of supported platinum to supported rhenium is 3:2.

17. The catalyst as set forth in claim 14, wherein the weight ratio of supported platinum to supported rhenium is 1:1.

18. The catalyst as set forth in claim 14, wherein the weight ratio of supported platinum to supported rhenium is 1:3.

19. A catalyst, comprising platinum and rhenium as catalyst metals on a rutile titania support, which is in the form of a pellet having a particle size of 0.5 to 1 mm.

20. A catalyst, comprising platinum and rhenium as catalyst metals on a rutile titania support, which is in the form of a pellet having a particle size of 1.4 to 2.0 mm.

* * * * *